US012743307B2

(12) United States Patent
Durazzo et al.

(10) Patent No.: US 12,743,307 B2
(45) Date of Patent: Sep. 22, 2026

(54) QUANTUM JOB SUBMISSION AND OPTIMIZATION FOR END-TO-END ALGORITHMS WITH PRIORITIZATION OF PLACEHOLDERS OF QUANTUM JOBS IN JOB QUEUE

(71) Applicant: Dell Products L.P., Round Rock, TX (US)

(72) Inventors: Kenneth Durazzo, Morgan Hill, CA (US); Stephen J. Todd, North Andover, MA (US); Michael Robillard, Shrewsbury, MA (US); Victor Fong, Melrose, MA (US); Eric Bruno, Shirley, NY (US); Benjamin Santaus, Somerville, MA (US)

(73) Assignee: Dell Products L.P., Round Rock, TX (US)

( * ) Notice: Subject to any disclaimer, the term of this patent is extended or adjusted under 35 U.S.C. 154(b) by 635 days.

(21) Appl. No.: 17/811,339

(22) Filed: Jul. 8, 2022

(65) Prior Publication Data

US 2024/0012681 A1 Jan. 11, 2024

(51) Int. Cl.
*G06F 9/48* (2006.01)
*G06N 10/40* (2022.01)

(52) U.S. Cl.
CPC ........... *G06F 9/4887* (2013.01); *G06N 10/40* (2022.01)

(58) Field of Classification Search
None
See application file for complete search history.

(56) References Cited

U.S. PATENT DOCUMENTS 4,914,570 A 4/1990 Peacock
6,714,960 B1 * 3/2004 Bitar .................... G06F 9/4881 718/103
10,817,337 B1 10/2020 Richardson et al.
11,170,137 B1 11/2021 Richardson et al.
11,270,220 B1 3/2022 Richardson et al.
11,663,051 B2 * 5/2023 Vasileiadis ........... G06F 9/4887 718/105
12,032,888 B2 * 7/2024 Doi .................... G06F 30/3308
2009/0070550 A1 * 3/2009 Solomon .............. G06F 15/803 712/15
2011/0161965 A1 6/2011 Im et al.
2011/0307437 A1 * 12/2011 Aliferis ................. G06N 20/00 706/46
2016/0357676 A1 * 12/2016 Cain, III ............ G06F 12/0862
2018/0308000 A1 10/2018 Dukatz et al.
2018/0375784 A1 * 12/2018 Balakrishnan ...... H04L 47/6275
2019/0213509 A1 * 7/2019 Burleson ............... G06N 20/00
2019/0243682 A1 8/2019 Botelho
2020/0201655 A1 6/2020 Griffin et al.
2021/0073028 A1 3/2021 Li et al.
2021/0158425 A1 5/2021 Kasprowicz et al.
2021/0294644 A1 * 9/2021 Nott ...................... G06F 9/4881

(Continued)

*Primary Examiner* — Zujia Xu
(74) *Attorney, Agent, or Firm* — Workman Nydegger

(57) ABSTRACT

Quantum job prioritization is disclosed. Quantum jobs may be stored as placeholders in a job queue associated with a quantum processing unit. The quantum jobs are prioritized to improve the usage of the quantum processing unit. Prioritizing quantum jobs allows the quantum processing unit to execute quantum jobs in different orders rather than on an application basis. This allows grace periods to be used for executing quantum jobs.

20 Claims, 6 Drawing Sheets

(56) References Cited

U.S. PATENT DOCUMENTS

| | | | | |
|---|---|---|---|---|
| 2021/0357278 | A1 | 11/2021 | Lee et al. | |
| 2022/0383171 | A1 | 12/2022 | Griffin et al. | |
| 2022/0398129 | A1* | 12/2022 | Bishop, III | G06F 9/5038 |
| 2022/0414509 | A1* | 12/2022 | Haah | G06N 10/70 |
| 2023/0066093 | A1 | 3/2023 | Coady et al. | |
| 2023/0110628 | A1 | 4/2023 | Heckey et al. | |
| 2023/0140809 | A1* | 5/2023 | Palop | G06F 9/5027 706/12 |
| 2023/0315539 | A1 | 10/2023 | Scheps et al. | |
| 2023/0342652 | A1 | 10/2023 | Haverkamp et al. | |
| 2024/0378085 | A1* | 11/2024 | Ravi | G06N 10/80 |
| 2024/0394414 | A1* | 11/2024 | Radha | G06F 9/5044 |

* cited by examiner

QUANTUM JOB SUBMISSION AND OPTIMIZATION FOR END-TO-END ALGORITHMS WITH PRIORITIZATION OF PLACEHOLDERS OF QUANTUM JOBS IN JOB QUEUE

FIELD OF THE INVENTION

Embodiments of the present invention generally relate to quantum computing systems and to systems that include or use quantum computing systems. More particularly, at least some embodiments of the invention relate to systems, hardware, software, computer-readable media, and methods for submitting quantum jobs to quantum computing systems and orchestrating the execution of hybrid applications and/or quantum jobs.

BACKGROUND

Hybrid quantum computing generally refers to the concept of using both classical computing systems (processors, memory) and quantum computing systems to perform or execute algorithms. A hybrid quantum algorithm (hybrid algorithm or process) typically includes classical or computing portions and quantum portions. For example, the computing portion may execute and generate a result or output that serves as the input to the quantum portion of the hybrid process.

The quantum portion of a hybrid process may be outsourced to a quantum vendor or provider. The quantum provider may provide quantum services, or Quantum as a Service (QaaS), to multiple users and has an incentive to maximize use of their quantum computing system(s). The ability to maximize or at least improve the use of a quantum computing system, specifically a quantum processing unit, is complicated.

When executing a hybrid process, the execution of the hybrid process may require multiple quantum jobs or multiple iterations of quantum circuit execution. From a quantum provider's perspective, this complicates the ability to maximize the use of their quantum computing system because of the need to schedule and execute multiple iterations of quantum jobs (which may be separated in time) of a specific hybrid process in the context of servicing the quantum job requests from other users. The quantum provider may need to meet service level agreement (SLAs) or other requirements.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
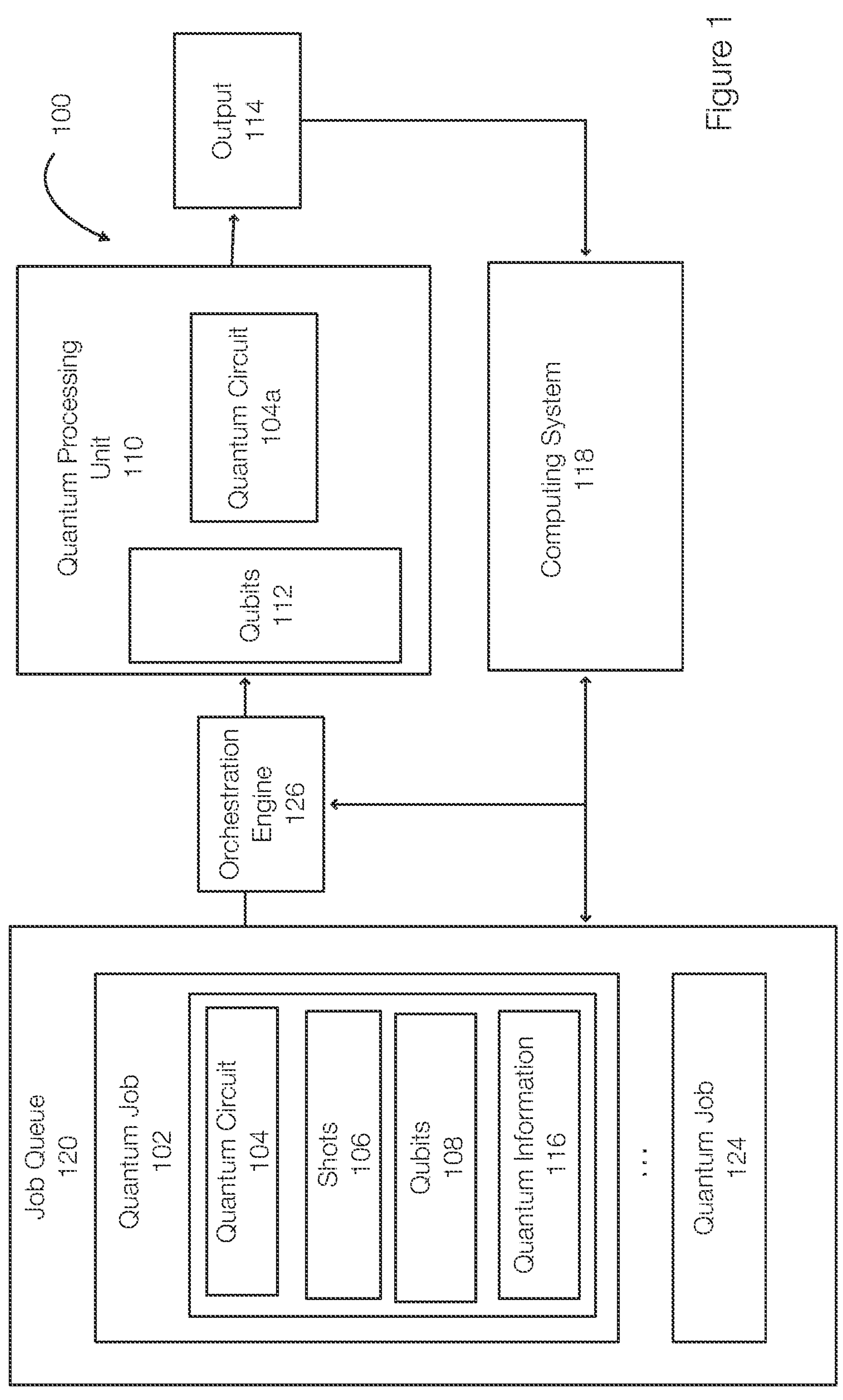
FIG. 1 discloses aspects of a hybrid system including a computing system and a quantum processing unit.

Embodiments of the present invention generally relate to quantum computing and quantum computing systems. More particularly, at least some embodiments of the invention relate to systems, hardware, software, computer-readable media, and methods for submitting, prioritizing, and/or optimizing the submission, order of execution, and/or execution of quantum jobs that are or will be executed in a quantum processing unit or other accelerator.

Embodiments of the invention relate to a mechanism that allows quantum jobs to be submitted to a quantum computing system and prioritized. The quantum jobs submitted to a quantum computing system may be stored or referenced in a job queue. The quantum jobs are prioritized.

During operation, the quantum computing system executes the quantum jobs using the job queue. For example, the quantum job at the top or front of the job queue may be executed. The quantum job to be executed next, however, may depend on how the quantum jobs are rearranged or prioritized. Thus, the next quantum job to be executed can change over time as the quantum jobs are prioritized and/or as new jobs are submitted to the job queue.

Embodiments of the invention further relate to including future quantum jobs in the queue and to prioritizing the quantum jobs in the queue, including the future jobs. Prioritizing the quantum jobs may include rearranging the quantum jobs in the job queue, determining or changing an execution schedule of the quantum jobs (the order of execution), or the like.

A hybrid process, by way of example, is an algorithm or application that uses both a classical computing system and a quantum computing system. The classical computing system may include a processor, memory or the like and may be implemented as a server computer, a virtual machine, a container, a physical machine, a computing device/system, or the like. The quantum computing system may include a quantum processing unit (QPU). The QPU may be physical (real) or may be emulated in classical hardware as a virtual QPU (vQPU). In one example, QPUs, vQPUs, FPGAs (Field Programmable Gate Arrays), GPU (Graphic Processing Unit) are examples of accelerators that may be involved in the hybrid process.

A hybrid process or application may include a computer portion and a quantum portion. The computer portion executes on a classical computer system and the quantum portion executes in a quantum computing system. For example, the computer portion may execute and generate an output (e.g., a quantum job which includes a quantum circuit) that serves as input to the quantum portion. The quantum portion executes in the quantum computing system and generates an output that may be returned to the computer portion. While the computer portion executes in the classical computing system, the quantum computing system may be idle. While the quantum computing system executes, the classical computing system may be idle. Embodiments of the invention may prioritize the quantum jobs in the job queue to reduce the time that the quantum computing system is idle.

In some examples, the quantum computing system is provided by a provider. When a user executes a hybrid process and requires quantum computing or processing, the quantum portion of the hybrid process may be submitted to the provider's quantum computing system. When many quantum computing systems are available to the user, the user may choose one of the quantum computing systems.

The quantum portion of a hybrid process may include quantum jobs and each quantum job includes at least one quantum circuit. The quantum jobs may be iterations of the same quantum job. The iterations performed by the quantum portion may include the same or different quantum jobs. More specifically, a hybrid process may require multiple quantum jobs or many iterations of quantum circuit execution.

When a hybrid process begins execution, the number of quantum jobs or quantum circuit executions may be determined (or estimated or predicted) in advance. For example, the number of quantum jobs in QML (Quantum Machine Learning) may be deterministic and knowable in advance. For other quantum jobs, such as VQE (Variational Quantum Eigensolver) algorithms, the number of quantum jobs may be estimated or predicted. This estimation may be continuously or regularly updated.

When executing a hybrid process and the number of quantum jobs is determined or estimated, the quantum jobs may be submitted to the job queue of a quantum computing system. Because quantum jobs of a hybrid process are performed iteratively, some of the jobs are future jobs that will not be performed until after earlier jobs are performed. In effect, the job queue includes future quantum jobs. Because the details of the future quantum jobs may not yet be known, a placeholder is placed in the job queue. However, the placeholder may include sufficient information to allow all jobs, including the future jobs, to be prioritized.

The quantum jobs in the job queue may include the quantum jobs to be performed during end-to-end execution of multiple hybrid processes. Embodiments of the invention evaluate the job queue and/or the quantum jobs ordered therein, including the future jobs, and reprioritize the quantum jobs in the job queue.

Embodiments of the invention provide a mechanism that allows quantum jobs to be submitted to a job queue, reprioritizes the quantum jobs in the job queue, and defines or determines the quantum job that is to execute during a grace period. The grace period (also referred to herein as a delay or wait time/period), by way of example, is the time required by the classical computing system to generate information required for the next quantum job of the hybrid process.

FIG. 1 discloses aspects of performing a quantum job in a quantum computing system. FIG. 1 illustrates a hybrid system 100 that includes or has access to a quantum processing unit 110 (part of a quantum computing system). The quantum processing unit 110 may include or have access to computing hardware that provides the input to the quantum processing unit 110 and that receives the output 114 of the quantum processing unit 110.

The hybrid system 100 may also include or have access to a computing system 118 (processors, memory, network hardware, etc.). The computing system 118 and/or the quantum processing unit 110 may be associated with different providers, owners, users, or the like. In some examples, a user may be associated with the computing system 118. When the user executes a hybrid process, quantum jobs of the hybrid process may be sent to and executed by the quantum processing unit 110.

The computing system 118 may feed or input a quantum job to the quantum processing unit 110 and may also be an interface between the quantum processing unit 110 and other remote compute/quantum computing systems. In addition, the quantum processing unit 110 may be remote from computing system 118.

In one example, the computing system 118 may interact with the quantum processing unit 110 via an orchestration engine 126 and/or the job queue 120. Quantum jobs may be submitted to the job queue 120 by the computing system 118 or by the orchestration engine 126. When a specific quantum job is ready for execution, the computing system 118 may provide details (qubits, shots, quantum circuit) to the orchestration engine 126, which inputs the quantum job to the quantum processing unit 110. The orchestration engine 126, which may submit the quantum jobs from the job queue 120 to the quantum processing unit 110, may prompt the computing system 118 to provide the details of the quantum job.

The quantum processing unit 110 is typically associated with qubits 112. The number of qubits 112 is typically fixed. The quantum processing unit 110 may handle any quantum circuit that is configured for a number of qubits equal to or less than the number of qubits 112. In some instances, some of the qubits 112 of the quantum processing unit may go unused when the quantum job 102 requires less than all of the qubits 112 of the quantum processing unit 110. This may allow the quantum processing unit 110 to execute another quantum job at the same time as long as the necessary qubits are available and when the two (or more) quantum jobs can operate independently (e.g., are not entangled).

The computing system 118 may maintain or have access to the queue 120 (queue 120) of the quantum processing unit 110 via the orchestration engine 126. The quantum processing unit 110 pulls jobs from the job queue 120, in one example using the orchestration engine 126. Alternatively, the orchestration engine 126 may operate as a controller to submit a quantum job to the quantum processing unit 110. In this example, the job queue 120 includes a quantum job 102 and a quantum job 124, which are representative of any number of quantum jobs. The quantum job 102, by way of example, may include or reference a quantum circuit 104, shots 106, qubits 108, and other quantum information 116.

The quantum circuit 104 may define how qubits are initialized, number of qubits, a sequence of quantum operations, shots, depth, quantum measurements, and the like. The quantum circuit 104 may or may not entangle at least some of the qubits. The shots 106 is the number of times that the quantum circuit 104 is to be executed by the quantum processing unit 110. The qubits 108 is the number of qubits required or specified for the quantum job 102. The quantum information 116 may include quantum processing unit model expected by the user, pricing, budget, or the like.

When the quantum processing unit 110 is ready to perform the next quantum job and the next quantum job is the quantum job 102, the quantum job 102 is retrieved from the job queue 120. Alternatively, particularly when the quantum jobs in the job queue 120 are only placeholders, the computing system 1118 will be prompted to submit the quantum job 102 to the quantum processing unit 110. The quantum processing unit 110 is initialized with the quantum circuit 104 (represented as quantum circuit 104*a*). Once the quantum circuit 104*a* is prepared and initialized in the quantum processing unit 110, the specified number of shots 106 of the quantum circuit 104*a* are performed iteratively.

Each shot generates an output 114. More specifically, each shot results in a bitstring whose length is equal to the number of qubits 108. The output 114 commonly includes a distribution of bitstrings. The output 114 is received by the computing system 118. Once the output 114 for the quantum job 102 is received, the computing portion of the hybrid process executes using the output 114. When completed, the next quantum job of the hybrid process, which may be the quantum job 124, may be executed by the quantum processing unit 110.

As previously stated, a grace period may be a period of time during which the computing system 118 operates on the output 114 and prepares the next quantum job 124. During the grace period, or at other times, the orchestration engine 126 may evaluate the quantum jobs in the job queue 120 and submit another quantum job (or direct another computing system or user to submit a quantum job) to the quantum processing unit 110 such that the quantum processing unit 110 is not idle during the grace period.

Although FIG. 1 illustrates example relationships between the computing system 118, the quantum processing unit 110, and the orchestration engine 126, other arrangements are possible. For example, the both the computing system 118 and the quantum processing unit 110 may be cloud or edge-based systems. Providers may provide hybrid systems for hybrid applications. Client devices (or the computing system 118) may access the orchestration engine 126 or the quantum processing unit 110 using an API (Application Programming Interface). The job queue 120 may be accessed by the computing system 118 via the orchestration engine 126.

Figure 2:
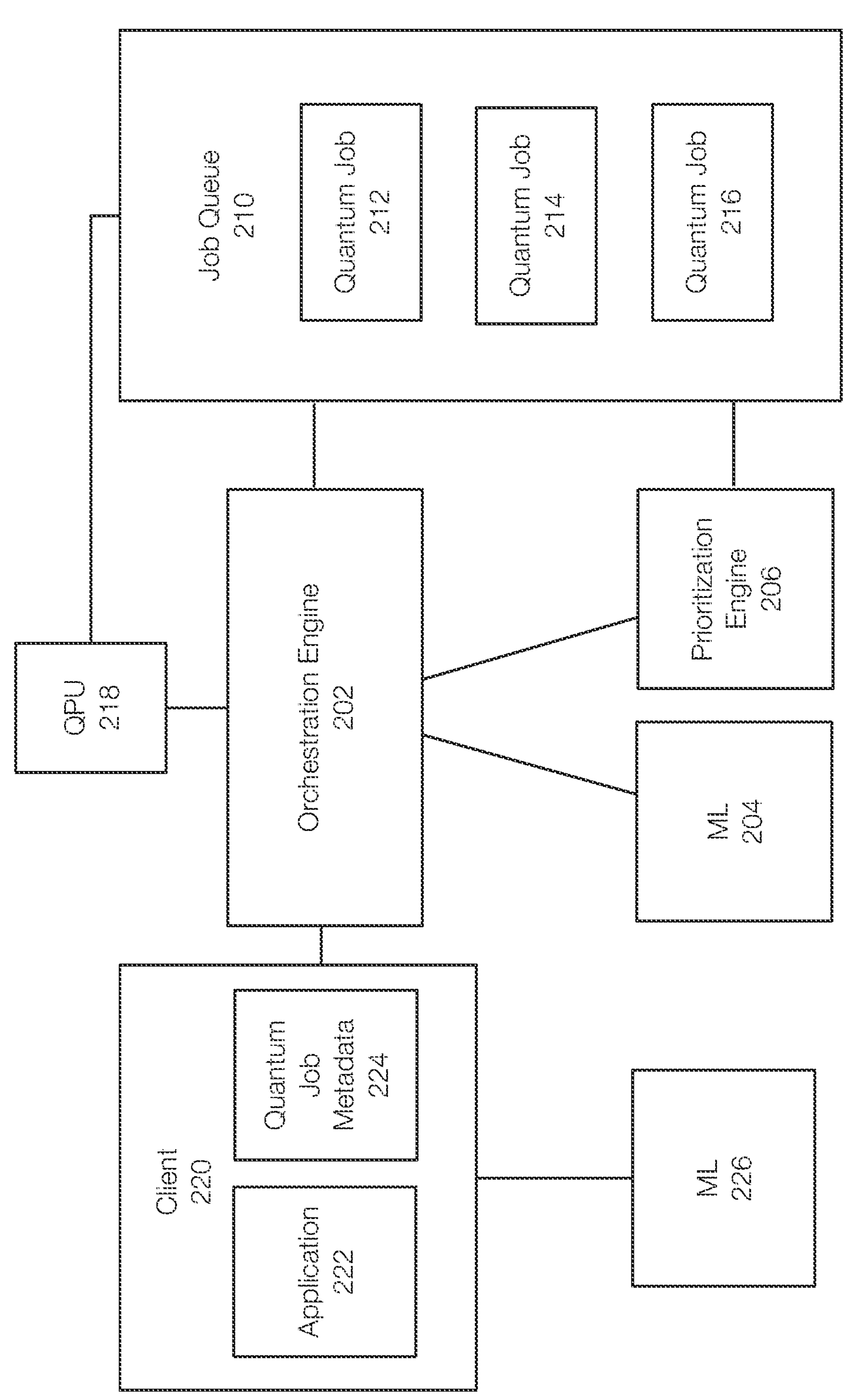
FIG. 2 discloses aspects of submitting quantum jobs to a quantum processing unit and discloses aspects of prioritizing quantum jobs in a quantum job queue.

FIG. 2 discloses aspects of prioritizing quantum jobs. In FIG. 2, a client 220, which may be associated with a user, may have an application 222 (an example of a hybrid process) that requires an accelerator such as a quantum processing unit or QPU 218. When the application 222 is initiated, the client 220 (or the application 222) may determine, estimate, or predict that the end-to-end execution of the application 222 may require X number of quantum jobs (each with one or more quantum circuits with Y shots and Z depth. This may be predicted by a machine learning model (ML) 226. This information is included or identified as quantum job metadata 224 and may be provided to an orchestration engine 202. In one example, the quantum jobs associated with the application 222 may have the same or different characteristics (e.g., circuit configuration, number of shots, depth). The quantum job metadata 224 allows the orchestration engine 202 to estimate various characteristics of the quantum jobs, including execution times.

In this example, the quantum job metadata 224 is submitted to an orchestration engine 202, which may enter the quantum jobs of the application 222 into the job queue 210. More specifically in one example, the quantum jobs of the application 222 are entered into the job queue 210 as placeholders. Thus, the quantum jobs 212, 214, 216, which represent all quantum jobs in the job queue 210, may include quantum jobs for the application 222 and/or other applications from the client 220 and/or other clients. When the time for executing the quantum job 212 arrives, the classical system (e.g., the client 220 or the application 222) is notified to submit the quantum job.

The placeholders may include at least some of the quantum job metadata 224 such that the prioritization engine 206, which may be part of the orchestration engine 202, can evaluate the quantum jobs in the job queue 210 and reprioritize the quantum jobs in the job queue 210. In one example, the ML 204 may be used to predict runtime characteristics of each of the quantum jobs 212, 214, and 216 in the job queue 210 based on features such as number of shots, depth, number of qubits, entanglement, gates, or the like or combinations thereof. The features may include or may be extracted from the quantum job metadata 224. The runtime characteristics may include anticipated or expected execution time.

The prioritization engine 206 may order or prioritize the quantum jobs in the job queue 210 based on the runtime characteristics and/or user intents in some example embodiments. For example, user intents may include budget, execution deadline, accuracy, confidence, cost, user-defined priority, or the like. Using user intents, the characteristics of the quantum jobs in the job queue (including future quantum jobs), wait times (e.g., grace periods), and the like may be used to prioritize the quantum jobs in the job queue 210. Prioritization may consider these factors in a weighted manner. For example, execution time and execution deadline may be weighted more heavily than accuracy or confidence.

Figure 3A:
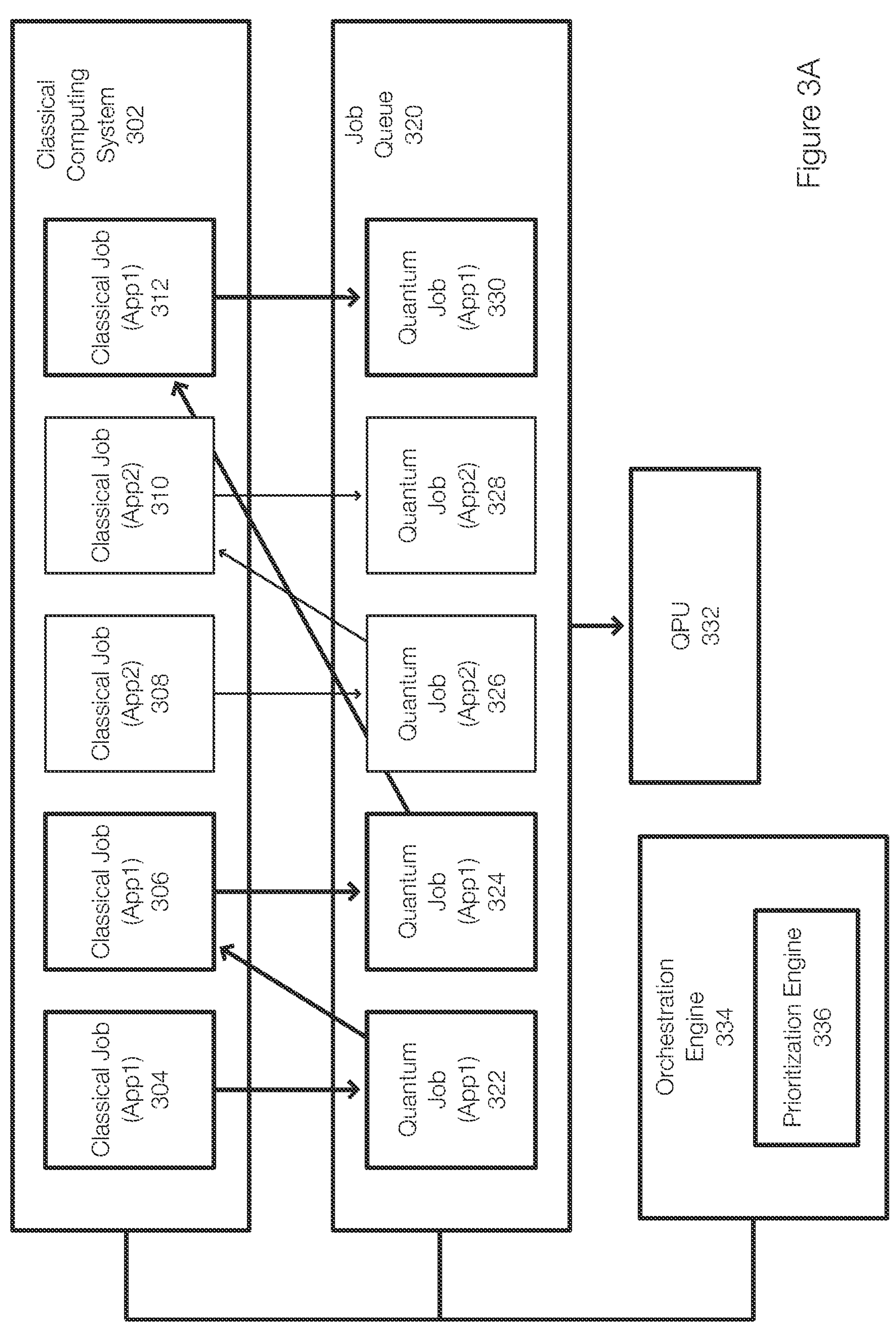
FIG. 3A discloses aspects of continually prioritizing quantum jobs in a quantum job queue.

FIG. 3A discloses aspects of prioritizing quantum jobs. FIG. 3 illustrates a classical computing system 302. As previously stated, an application may include computer portions and quantum portions. In FIG. 3A, the computer portions and quantum portions are represented as, respectively, classical jobs and quantum jobs. An application may include one or more classical jobs and one or more quantum jobs.

In this example, it has been determined that the application 1 (App1) includes three quantum jobs 322, 324, and 330. The application 2 (App2) includes two quantum jobs 326 and 328. The classical jobs 304, 306, and 312 are associated with App1 and the classical jobs 308 and 310 are associated with App2.

When App1 begins execution, the number of quantum jobs (3 in this example) is determined (e.g., estimated, predicted) and the quantum jobs, along with quantum job metadata, are submitted to the job queue 320. A similar process occurs with the App2. As previously stated, the job queue 320 may only include placeholders. The substance of the quantum jobs is submitted when the QPU 332 is ready to execute the quantum job in some examples.

The execution of App1 (order of job execution) may occur as follows: classical job 304, quantum job 322, classical job 306, quantum job 324, classical job 312, and quantum job 330. Each of these jobs is, in effect, waiting for the output/completion of the earlier job. These quantum jobs 322, 324, and 330 are submitted to the job queue 320 and App1 begins executing. Assuming that the quantum job 322 is at the front of the queue, the quantum job 322 is submitted and executed by the QPU 332 after the classical job 304 is finished.

The orchestration engine 334 may be configured to determine or estimate a delay or wait time (the grace period) between the end of quantum job 322 and the beginning of the quantum job 324. In other words, this specific grace period for App1 corresponds to the time required to perform the classical job 306.

The grace period, user intents (for both App1 and App2), QPU execution times of the quantum jobs 324, 326, 328, and 330, and/or other characteristics are used by the prioritization engine 336 to prioritize the quantum jobs in the job queue 320. The prioritization engine 334 can select the next quantum job to be executed by the QPU 332. Stated differently, the prioritization engine 334 may rearrange the quantum jobs in the queue 320 and the next quantum job to be performed is at the front of the job queue 320.

For example, the grace period associated with the classical job 306 allows the quantum job 326 to be prioritized such that the quantum job 326 is performed once the quantum job 322 completes. This advantageously allows the orchestration engine 334 to ensure that usage of the QPU 332 is improved. The prioritization engine 336 may operate continuously or repeatedly such that the quantum jobs in the job queue 320 are performed in an efficient manner and to ensure that grace periods associated with classical jobs are used to perform other quantum jobs.

Figure 3B:
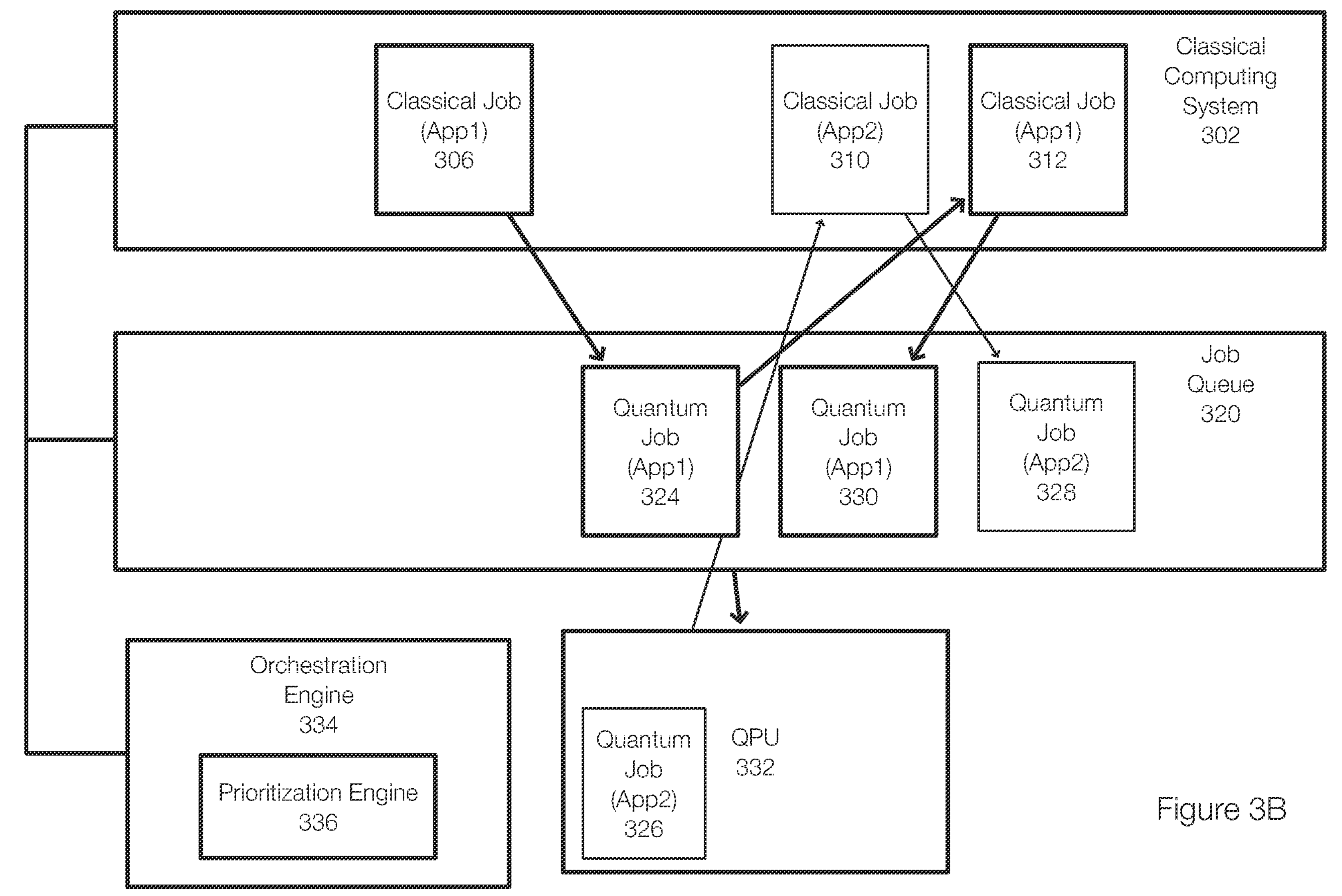
FIG. 3B discloses aspects of reprioritized quantum jobs in a quantum job queue.

FIG. 3B discloses additional aspects of prioritizing quantum jobs in a job queue. FIG. 3B (with reference to FIG. 3A) that the quantum job 322 has been completed and is removed from the job queue 320. The classical job 304 has been completed and the classical computing system 302 is currently performing the classical job 306. For the App2, the classical job 308 has been completed and the quantum job 326 is currently being executed by the QPU 332 during the grace period associated with the classical job 306. Thus, the prioritization engine 336 rearranged the order of the quantum jobs such that the quantum job 326, associated with a different application than the quantum job 322, is performed during the grace period of App1. When the quantum job 322 finished executing, the orchestration engine 334 requested the quantum job 326 from the App2. Placeholders are removed from the job queue 320 as needed.

Figure 4:
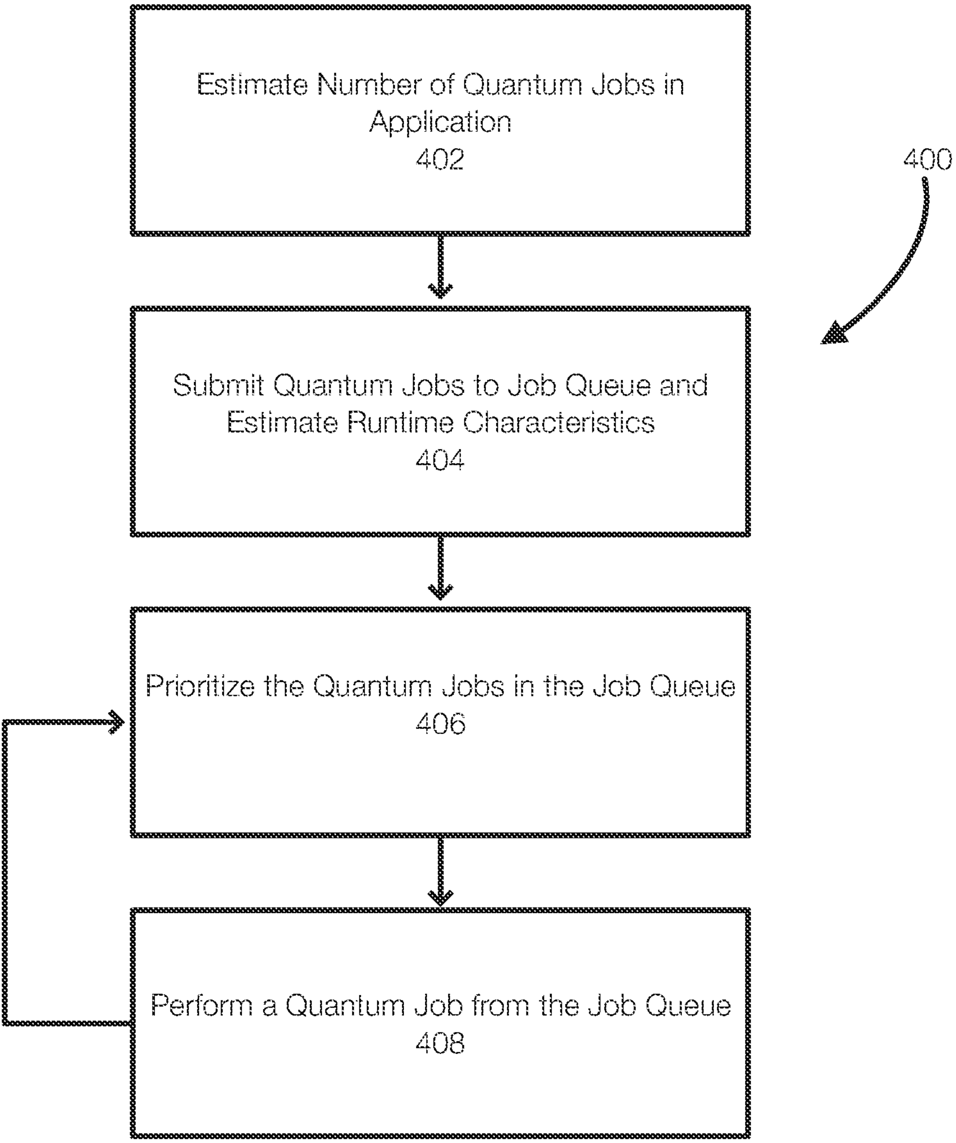
FIG. 4 discloses aspects of submitting, prioritizing, and/or performing quantum jobs associated with multiple users.

FIG. 4 discloses aspects of prioritizing quantum jobs. When an application that includes computer and quantum portions is initiated, the number of quantum jobs in the application is estimated 402 in the method 400. The estimation 402 may estimate the number of quantum jobs (number of quantum circuits, shots, and depth). The estimation may also include an estimated end-to-end execution time. The quantum jobs may be submitted 404 to a job queue of a quantum system at least as placeholders and/or with sufficient information to be prioritized. Including the quantum jobs of an application in the job queue allows an orchestration engine to prioritize the execution of the quantum jobs. When submitting the quantum jobs, the runtime characteristics of the quantum jobs may also be estimated by a machine learning model. The runtime estimation may account for features such as number of shots, depth, circuit elements, entanglement, or the like.

Once the quantum jobs are submitted, or as new quantum jobs are added to the job queue, the quantum jobs in the job queue are prioritized. The prioritization may be performed using heuristics and may be achieved using a greedy search, linear programming, a heuristic search, or the like. In one example, the prioritization engine may search a solution space that reflects user intents, estimated execution time, estimated delay between quantum jobs, estimated runtime, or the like. The search may consider number of shots, depth, and the like. The prioritization may consider one or more characteristics. For example, the quantum jobs may be prioritized based on user-priority, application completion time, execution time, or the like or combination thereof. The factors used to prioritize the quantum jobs may be weighted.

More specifically, the prioritization engine may consider the end-to-end application execution time, user priority, quantum job execution time, estimated grace periods, or the like when prioritizing the quantum jobs. When a grace period between quantum jobs of the same application is higher than the estimated time of another quantum job, which may be unrelated, then the queue may be rearranged or prioritized such that the identified quantum job is executed next.

Once the quantum jobs are prioritized, a quantum job from the job queue (e.g., the highest priority quantum job) 408 is performed or executed by the QPU.

In one example, the grace period between successive quantum jobs of an application may be estimated in different manners. In one example, the grace period is predicted based on a historical average of grace periods. Machine learning can also predict grace periods using features of the computer portions.

When a quantum job with a low user-defined priority enters the job queue, the user can be provided with a better estimate of the expected wait time before their quantum job will be executed. The ability to account for user intents, estimated execution times, estimated grace periods, and the like allows this information (wait time until quantum job is executed) to be estimated more effectively.

As an application executes, the future quantum jobs can be refined. Refinement factors include the number of quantum circuits, circuit requirements (shots, number of qubits) and the like. As quantum jobs are refined, the orchestration engine or the prioritization engine can reprioritize the quantum jobs in the job queue continuously. More specifically, the requirements and or number of quantum executions may become more precise as an application executes. As a result, the estimations and prioritizations improve.

Embodiments of the invention thus allow future quantum jobs to be submitted (e.g., as placeholders). The orchestration engine can adapt the job queue to the number of quantum jobs, make adjustments for the number of jobs, and refine the prioritization of the quantum jobs. For example, the number of quantum iterations of some applications may not be known or may not be deterministic. Embodiments of the invention can account for revised estimations (e.g., re-estimate the quantum circuits) as the application executes. The orchestration engine can schedule more effectively as the grace periods between submissions is measured and estimated. The ability to reprioritize the job queue continuously is achievable and can be based on adjustments to the factors or characteristics that impact prioritization. User warning and wait time predictions can be based on the jobs, including future jobs, in the job queue.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, hybrid process operations including quantum job submission operations, quantum job prioritization operations, quantum job execution operations, or the like. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment. Embodiments may also be implemented in or via Qiskit Dell Runtime, which may include a platform configured to execute classical-quantum code on local, on-premise, and/or remote environments.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VM). Particularly, devices in the operating environment may take the form of software, physical machines, containers, or VMs, accelerators, or any combination of these, though no particular device implementation or configuration is required for any embodiment.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: placing quantum jobs in a job queue, wherein the quantum jobs are associated with applications, prioritizing the quantum jobs in the job queue based at least on a grace period associated with execution of a computer portion of one of the applications, and executing a highest priority quantum job from the job queue.

Embodiment 2. The method of embodiment 1, further comprising placing the quantum jobs in the job queue as placeholders, wherein each of the placeholders includes quantum job metadata, the quantum job metadata including one or more of quantum circuit, number of shots, number of qubits, quantum depth, and application end-to-end execution time.

Embodiment 3. The method of embodiment 1 and/or 2, further comprising estimating an execution time for each of the quantum jobs.

Embodiment 4. The method of embodiment 1, 2, and/or 3, wherein the quantum jobs include first quantum jobs associated with a first application, wherein a number of the first quantum jobs is estimated by the first application and wherein the first quantum jobs are performed at different times.

Embodiment 5. The method of embodiment 1, 2, 3, and/or 4, wherein a grace period is determined for each pair of the first quantum jobs.

Embodiment 6. The method of embodiment 1, 2, 3, 4, and/or 5, further comprising prioritizing the quantum jobs such that a second quantum job associated with a second application is performed during one of the grace periods.

Embodiment 7. The method of embodiment 1, 2, 3, 4, 5, and/or 6, further comprising prioritizing the quantum queue using a heuristic function.

Embodiment 8. The method of embodiment 1, 2, 3, 4, 5, 6, and/or 7, wherein the heuristic function is one of a greedy search, linear programming, or a heuristic search.

Embodiment 9. The method of embodiment 1, 2, 3, 4, 5, 6, 7, and/or 8, further comprising prioritizing the quantum job based on at least one of user intents, quantum job metadata, end-to-end application execution time, quantum job runtime characteristics, user-defined priority, or execution deadlines.

Embodiment 10. The method of embodiment 1, 2, 3, 4, 5, 6, 7, 8, and/or 9, further comprising refining the quantum jobs and/or a number of the quantum jobs in the job queue and reprioritizing the quantum jobs after refinement, wherein refinement factors include number of quantum circuits, number of shots, number of qubits, and depth.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'engine' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
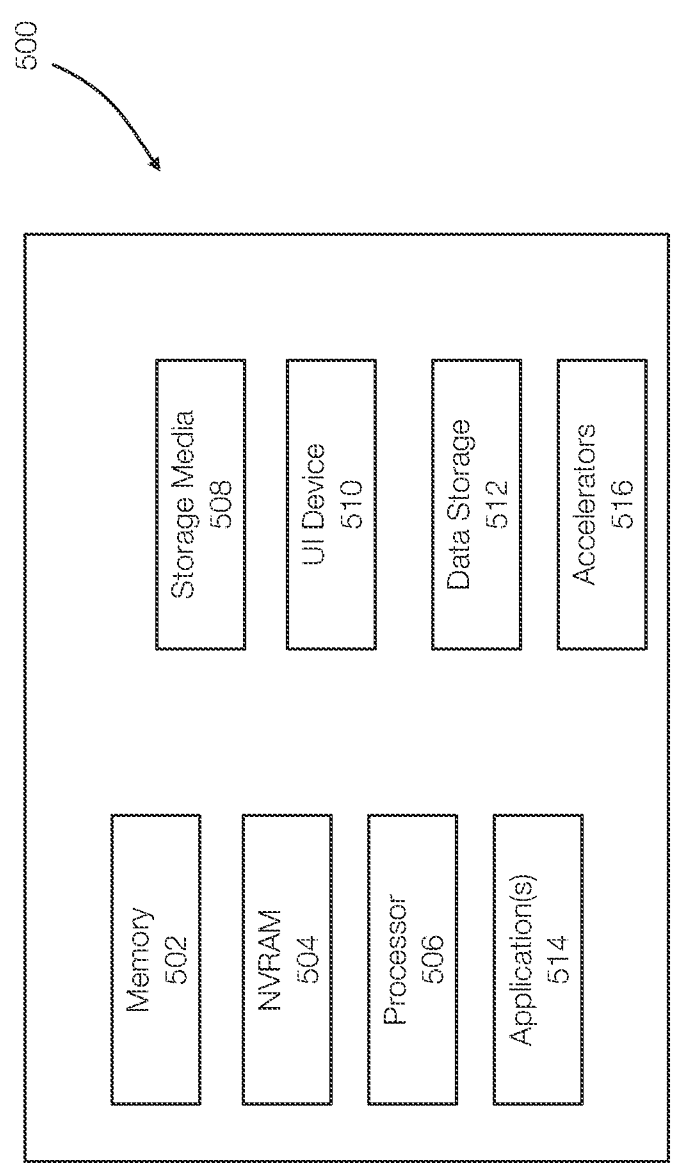
FIG. 5 discloses aspects of a computing system or device, and which includes or has access to quantum computing systems or other accelerators.

With reference briefly now to FIG. 5, any one or more of the entities disclosed, or implied, by Figures and/or elsewhere herein, may take the form of, or include, or be implemented on, or hosted by, a physical computing device, one example of which is denoted at 5. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid-state device (SSD) storage. As well, one or more applications 514 may be provided that comprise instructions executable by one or more hardware processors 506 to perform any of the operations, or portions thereof, disclosed herein. The computing device 500 may include, be associated with, or have access to accelerators 616 such as quantum processing units, virtual quantum processing units, Field Programmable Gate Arrays, graphics processing units, or the like.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

accessing an orchestration engine that includes a prioritization engine and a machine learning model, wherein the machine learning model is tasked with predicting runtime characteristics for quantum jobs of an application in a job queue, and wherein the prioritization engine is tasked with evaluating the quantum jobs of the application and prioritizing the quantum jobs based on the runtime characteristics;

placing the quantum jobs of the application in the job queue as placeholders, wherein the application includes a computing job, wherein at least some details of each of the quantum jobs are omitted in the respective placeholders, and wherein, when a time for executing one of the quantum jobs arrives, a classical system is notified to submit said one quantum job;

inserting respective quantum job metadata into the respective placeholders, the respective quantum job metadata including metadata structured to enable the prioritization engine to prioritize the quantum jobs;

causing the prioritization engine to prioritize the placeholders of the quantum jobs in the job queue based on a determined grace period associated with execution of the computer job of the application, wherein prioritizing the placeholders of the quantum jobs comprises applying the machine learning model, which is trained on different quantum job metadata inserted in the respective placeholders, to predict the runtime characteristics of each of the quantum jobs and using the prioritization engine to prioritize the placeholders of the quantum jobs based on the runtime characteristics, and wherein the grace period is dynamically determined as a time required by the computer job to generate an output that serves as input for a corresponding quantum job for execution in a quantum processing unit;

in response to a determination that a highest priority quantum job associated with a different application from the job queue is to be executed, obtaining substance of the highest priority quantum job by notifying the classical system to submit the highest priority quantum job;

after obtaining the substance of the highest priority quantum job, sending the highest priority quantum job to the quantum processing unit for execution; and executing the highest priority quantum job during the determined grace period of the computer job of the application.

2. The method of claim 1, wherein the quantum job metadata includes one or more of quantum circuit, number of shots, number of qubits, quantum depth, and application end-to-end execution time.

3. The method of claim 2, further comprising estimating an execution time for each of the quantum jobs.

4. The method of claim 2, wherein the quantum jobs include first quantum jobs associated with a first application, wherein a number of the first quantum jobs is estimated by the first application and wherein the first quantum jobs are performed at different times, wherein the first quantum jobs are associated with first computer jobs.

5. The method of claim 4, wherein a grace period is determined for each of the first computer jobs.

6. The method of claim 5, further comprising prioritizing the quantum jobs such that a second quantum job associated with a second application is performed during one of the grace periods.

7. The method of claim 1, further comprising prioritizing the job queue using a heuristic function.

8. The method of claim 7, wherein the heuristic function is one of a greedy search, linear programming, or a heuristic search.

9. The method of claim 8, further comprising prioritizing the quantum jobs based on at least one of user intents, the quantum job metadata, end-to-end application execution time, the runtime characteristics, user-defined priority, or execution deadlines.

10. The method of claim 1, further comprising refining the quantum jobs and/or a number of the quantum jobs in the job queue and reprioritizing the quantum jobs after refinement, wherein refinement factors include number of quantum circuits, number of shots, number of qubits, and depth.

11. A non-transitory storage medium having stored therein instructions that are executable by one or more hardware processors to perform operations comprising:

accessing an orchestration engine that includes a prioritization engine and a machine learning model, wherein the machine learning model is tasked with predicting runtime characteristics for quantum jobs of an application in a job queue, and wherein the prioritization engine is tasked with evaluating the quantum jobs of the application and prioritizing the quantum jobs based on the runtime characteristics;

placing the quantum jobs of the application in the job queue as placeholders, wherein the application includes a computing job, wherein at least some details of each of the quantum jobs are omitted in the respective placeholders, and wherein, when a time for executing one of the quantum jobs arrives, a classical system is notified to submit said one quantum job;

inserting respective quantum job metadata into the respective placeholders, the respective quantum job metadata including metadata structured to enable the prioritization engine to prioritize the quantum jobs;

causing the prioritization engine to prioritize the placeholders of the quantum jobs in the job queue based on a determined grace period associated with execution of the computer job of the application, wherein prioritizing the placeholders of the quantum jobs comprises applying the machine learning model, which is trained on different quantum job metadata inserted in the respective placeholders, to predict the runtime characteristics of each of the quantum jobs, and using the prioritization engine to prioritize the placeholders of the quantum jobs based on the runtime characteristics, and wherein the grace period is dynamically determined as a time required by the computer job to generate an output that serves as input for a corresponding quantum job for execution in a quantum processing unit;

in response to a determination that a highest priority quantum job associated with a different application from the job queue is to be executed, obtaining substance of the highest priority quantum job by notifying the classical system to submit the highest priority quantum job;

after obtaining the substance of the highest priority quantum job, sending the highest priority quantum job to the quantum processing unit for execution; and executing the highest priority quantum job during the determined grace period of the computer job of the application.

12. The non-transitory storage medium of claim 11, wherein the quantum job metadata includes one or more of quantum circuit, number of shots, number of qubits, quantum depth, and application end-to-end execution time.

13. The non-transitory storage medium of claim 12, further comprising estimating an execution time for each of the quantum jobs.

14. The non-transitory storage medium of claim 12, wherein the quantum jobs include first quantum jobs associated with a first application, wherein a number of the first quantum jobs is estimated by the first application and wherein the first quantum jobs are performed at different times, wherein the first quantum jobs are associated with first computer jobs.

15. The non-transitory storage medium of claim 14, wherein a grace period is determined for each of the first computer jobs.

16. The non-transitory storage medium of claim 15, further comprising prioritizing the quantum jobs such that a second quantum job associated with a second application is performed during one of the grace periods.

17. The non-transitory storage medium of claim 11, further comprising prioritizing the job queue using a heuristic function.

18. The non-transitory storage medium of claim 17, wherein the heuristic function is one of a greedy search, linear programming, or a heuristic search.

19. The non-transitory storage medium of claim 18, further comprising prioritizing the quantum jobs based on at least one of user intents, the quantum job metadata, end-to-end application execution time, the runtime characteristics, user-defined priority, or execution deadlines.

20. The non-transitory storage medium of claim 11, further comprising refining the quantum jobs and/or a number of the quantum jobs in the job queue and reprioritizing the quantum jobs after refinement, wherein refinement factors include number of quantum circuits, number of shots, number of qubits, and depth.

* * * * *